United States Patent
Idsinga

(10) Patent No.: US 6,914,887 B2
(45) Date of Patent: Jul. 5, 2005

(54) MANAGING LINKS BETWEEN PROCESSOR-BASED SYSTEMS

(75) Inventor: Andrew S. Idsinga, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 09/754,554

(22) Filed: Jan. 4, 2001

(65) Prior Publication Data

US 2002/0087669 A1 Jul. 4, 2002

(51) Int. Cl.[7] .............................................. H04L 12/28
(52) U.S. Cl. ..................... 370/255; 370/400; 709/222; 709/225; 709/228; 709/242
(58) Field of Search ................................ 709/203, 222, 709/223, 225, 227, 228, 237, 238, 242, 220; 370/235, 254, 255, 351, 400, 410; 340/825, 10.1, 10.3, 10.4

(56) References Cited

U.S. PATENT DOCUMENTS

| | | | | |
|---|---|---|---|---|
| 5,732,086 A | * | 3/1998 | Liang et al. | 370/410 |
| 5,796,736 A | * | 8/1998 | Suzuki | 370/254 |
| 6,101,528 A | * | 8/2000 | Butt | 709/203 |
| 6,182,136 B1 | * | 1/2001 | Ramanathan et al. | 709/224 |
| 6,253,337 B1 | * | 6/2001 | Maloney et al. | 714/38 |
| 6,327,252 B1 | * | 12/2001 | Silton et al. | 370/256 |
| 6,512,768 B1 | * | 1/2003 | Thomas | 370/389 |
| 6,549,932 B1 | * | 4/2003 | McNally et al. | 709/202 |
| 6,760,306 B1 | * | 7/2004 | Pan et al. | 370/230 |
| 6,795,403 B1 | * | 9/2004 | Gundavelli | 370/256 |
| 2002/0044533 A1 | * | 4/2002 | Bahl et al. | |
| 2002/0075834 A1 | * | 6/2002 | Shah et al. | |
| 2002/0075870 A1 | * | 6/2002 | Azevedo et al. | |
| 2003/0095504 A1 | * | 5/2003 | Ogier | |

FOREIGN PATENT DOCUMENTS

| | | | | | |
|---|---|---|---|---|---|
| JP | 10210029 A | * | 8/1998 | | H04L/12/18 |
| WO | WO 9957853 A1 | * | 11/1999 | | H04L/12/28 |

* cited by examiner

Primary Examiner—Anthony Knight
Assistant Examiner—Crystal J Barnes
(74) Attorney, Agent, or Firm—Joni Stutman-Horn

(57) ABSTRACT

Software on one system may query nodes which need to be addressed by clients on the system to determine whether those nodes are accessible. The software may query those nodes by sending a discovery message to those nodes and monitoring for a discovery response. If the discovery response is received, the software clients may be notified that the connection is existing and can be used to access the remote nodes.

11 Claims, 4 Drawing Sheets

MANAGING LINKS BETWEEN PROCESSOR-BASED SYSTEMS

BACKGROUND

This invention relates generally to processor-based systems which link to other processor-based systems using appropriate connections.

Processor-based systems may communicate with one another over communication links. These links may be wired or wireless links. For example, two processor-based systems may communicate over a network which may be a wired connection or they may communicate using a radio frequency connection.

Software applications on one system often need to understand what services are available from other nodes on the same network. As one example, a browser on a private intranet may need to know whether a web proxy service that resides on another system is available. In a mobile network environment, the physical network link between one or more nodes may change from one second to the next due to a variety of intermittent factors including radio signal propagation, battery life and physical proximity between two processor-based systems. Not only may the state of the link change, but in many systems, the address of a particular node may also change dynamically.

Thus, there is a need to enable applications at one node to know the state of a link which can connect applications on one node to specific services on one or more remote nodes.

DETAILED DESCRIPTION

Figure 1:
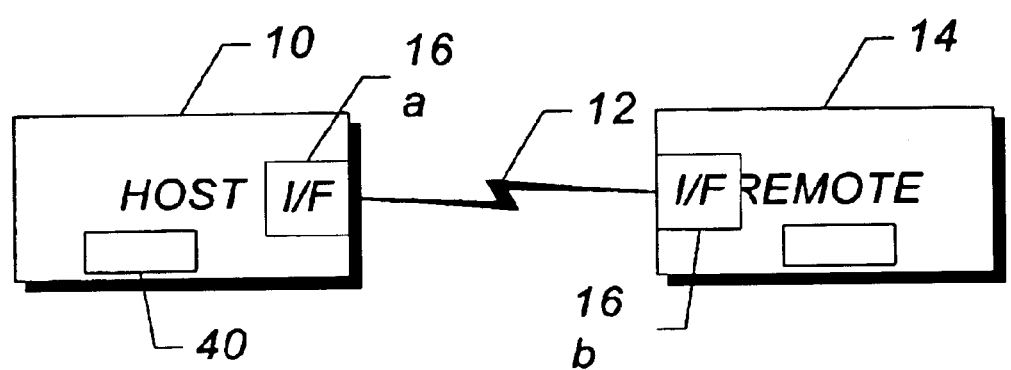
FIG. 1 is a schematic depiction of a system in accordance with one embodiment of the present invention.

As shown in FIG. 1, a host processor-based system 10 may communicate with a remote processor-based system 14 via a link 12. The link 12 may be hard wired or may form a wireless connection. For example, the link 12 may be a wireless link which links the remote processor-based system 14 with the host processor-based system 10. The remote processor-based system 14 may be a wireless device such as a web tablet or a portable device such as a personal digital assistant, a cellular telephone or an MP3 player, as examples. Conversely, the host processor-based system 10 in some examples may be a desktop computer, a laptop computer, a processor-based appliance or any other processor-based system.

The host processor-based system 10 may include a storage 40 that stores software for managing the link 12. The host processor-based system 10 may include an interface 16a to the link 12 and similarly the remote processor-based system 14 may include an interface 16b to the link 12. A state machine on the system 10 may be dynamically tuned for the characteristics of the network that includes the system 10. Thus, in one example, where the link 12 is a wireless link, the state machine's timing may be tuned for the timing and throughput characteristics of the wireless network.

Figure 2:
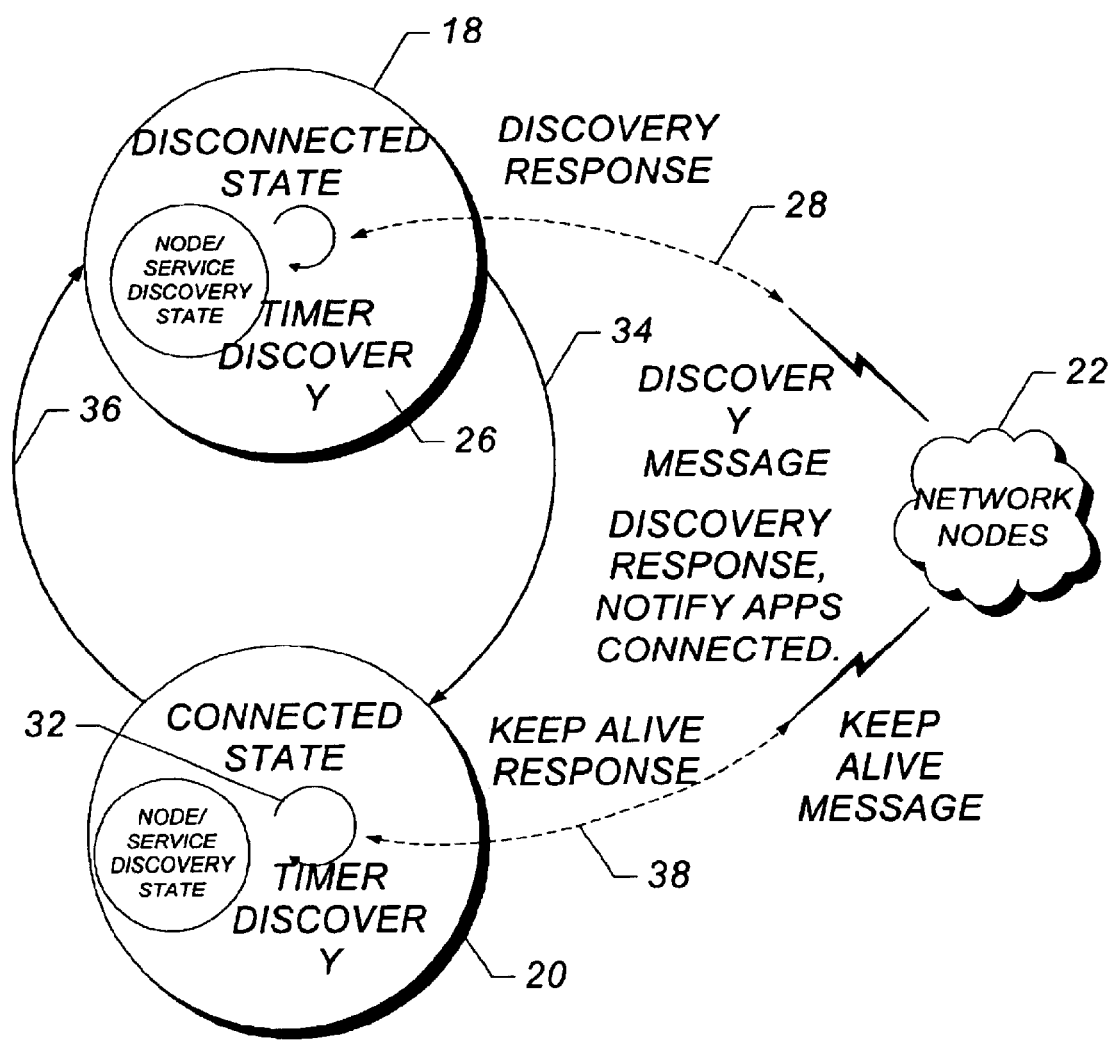
FIG. 2 is a state diagram for software resident on the host system shown in FIG. 1 in one embodiment of the present invention.

Referring to FIG. 2, a state diagram for the software stored on the storage 40 on the host processor-based system 10 includes two distinct states called the disconnected state 18 and the connected state 20. These states may be implemented through a state machine in one embodiment. Two or more nodes may be physically connectable, but still may be "disconnected" as far as the software is concerned. In the disconnected state 18, from the software perspective, the host processor-based system 10 is not connected to a network node 22 that may be, for example, the remote processor-based system 14. In the connected state, the host processor-based system 10 and remote processor-based system 14 may be connected over the link 12.

The software may transition, as indicated at 34, from the disconnected state 18 to the connected state 20 in response to an appropriate discovery response 28 received over the network from nodes 22. Similarly, the software may transition, as indicated at 36, from the connected state 20 to the disconnected state 18 when a keep alive response 38 is not received in response to a query made by the software or in case of a time out 32. When the system 10 has transitioned to the disconnected state 18, applications that may wish to use the link 12 may be notified that the link has been lost.

In the disconnected state 18, discovery queries may be posed to the nodes 22, as indicated at 28, at timed intervals 26 or in other sequences. In one embodiment, the node(s) 22 may correspond to the system 14. If a response to the discovery query is received, indicating that the node 22 is available and is connectable the software will transition from the disconnected state 18 to the connected state 20 as indicated at 34.

In the connected state 20, the software periodically queries the connection to the node(s) 22 to make sure that the connection(s) is/are still alive. In particular, a keep alive message 38 is sent to the node(s) 22, and if a response is not received after a particular time period, the software will transition to the disconnected state as indicated at 36.

Figure 3A:
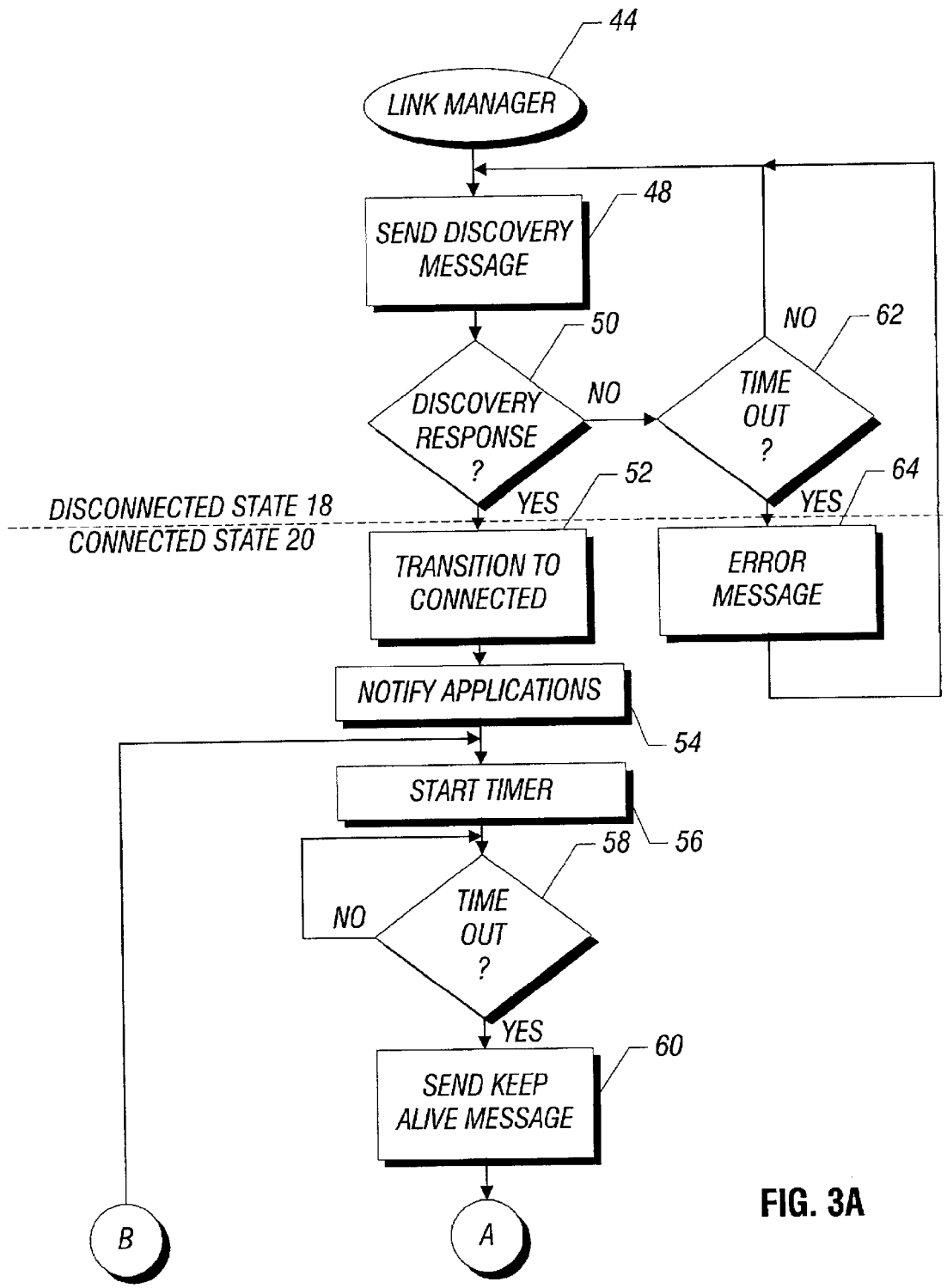
FIGS. 3A and 3B comprise a flow chart for software stored on the host system shown in FIG. 1 in accordance with one embodiment of the present invention.

Referring to FIG. 3A, software 44, to manage the link in accordance with one embodiment of the present invention, may be stored on the storage 40 of the host processor-based system 10. Upon system initialization, a discovery message is sent automatically as indicated in block 48. In one embodiment, the discovery message may be multicast to a plurality of nodes 22. A check at diamond 50 determines whether a discovery response is received indicating that the link 12 is available and the node(s) 22 is(are) accessible. If so, the software 44 transitions to the connected state 20 from the disconnected state 18 as indicated in block 52. Applications may be notified of the availability of the link as indicated in block 54.

A timer is started as indicated in block 56. At diamond 58 a check determines whether the timer has timed out. If so, a keep alive message is sent to the appropriate node(s) 22 in the connected state 20 as indicated in block 60.

Figure 3B:
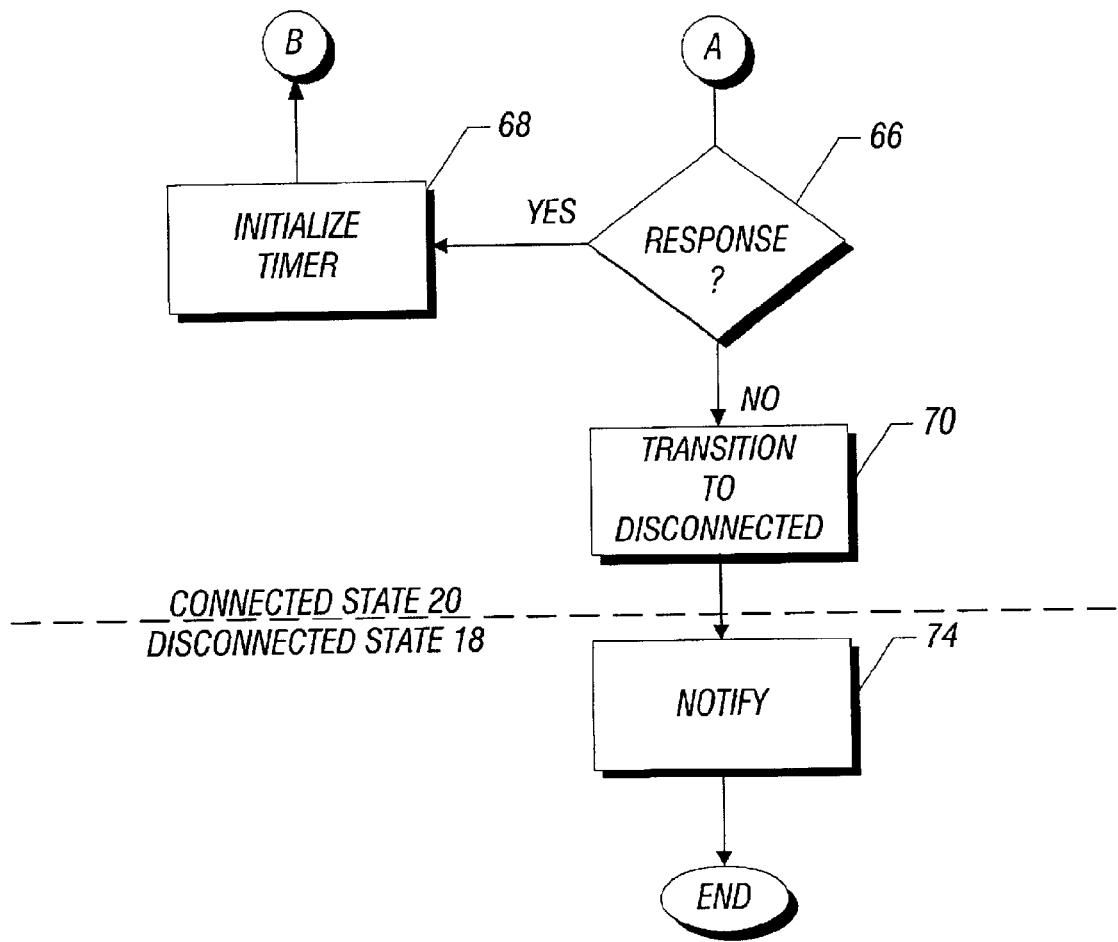

Moving to FIG. 3B, if a response is not received as determined in diamond 66, the software 44 transitions to the disconnected state 18 as indicated in block 70. Next, clients are notified of the link disconnection in block 74. Conversely, if a response is received to the keep alive request as determined in diamond 66, a timer is initialized, as indicated in block 68, and the timer is restarted in block 56 as the flow iterates.

Similarly, in the disconnected state 18, if a discovery response is not received after a time out, as determined in diamond 62, the flow iterates, continuing to send discovery messages until the node is located. If a time out occurs, an error message may be generated as indicated in block 64 and the flow may recycle.

In some embodiments of the present invention, by using node discovery to determine the state of the link, rather than a hardware based link state determination, the link state determination is based on real responses from actual nodes providing software services. This approach may tend to be more accurate, reliable and timely. Any time based discovery or keep alive queries are tunable for different applications and different physical network links. For example, the time outs indicated in diamonds 58 and 62 of FIG. 3 may be adjusted for particular network characteristics in some applications. In some embodiments, immediate or asynchronous link state information may be provided to applications as well as hardware or network protocol specific notifications.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

automatically sending a discovery message to a node;

enabling node access if a response to the discovery message is received;

automatically checking a link to the node to make sure that the node is still accessible; and implementing a state machine with a connected and a disconnected state and automatically transitioning from the disconnected state to the connected state when a response to a discovery message is received.

2. The method of claim 1 including notifying a client wishing to access a node when a state transition is made based on a response to a discovery message being received.

3. The method of claim 1, including automatically checking said node at timed intervals in order to maintain a connected state.

4. The method of claim 1 further including automatically sending a message to determine whether the node is still accessible after said response to said discovery message is received.

5. An article comprising a medium storing instructions that enable a processor-based system to:

send a discovery message to a node in response to a request to access the node;

enable node access if a response to the discovery message is received;

automatically check a link to the node to make sure that the node is still accessible; and implement a state machine with a connected and a disconnected state and to automatically transition from the disconnected state to the connected state when a response to a discovery message is received.

6. The article of claim 5 further storing instructions that enable the processor-based system to notify a client wishing to access a node when a state transition is made based on a response to a discovery message being received.

7. The article of claim 5 further storing instructions that enable the processor-based system to automatically check the node at timed intervals.

8. The article of claim 5 further storing instructions that enable the processor-based system to automatically send a message to determine whether the node is still accessible after said response to said discovery message is received.

9. A system comprising:

a network interface; and a storage coupled to said network interface, said storage storing instructions that enable said system to automatically send a discovery message to a node aver said interface to access the node and to enable node access if a response to the discovery message is received, said storage storing instructions that enable said system to automatically check said node at timed intervals in order to maintain a connected state, and said storage further storing instructions that enable said system to implement a state machine with a connected and a disconnected state and automatically transitioning from the disconnected state to the connected state when a response to a discovery message is received.

10. The system of claim 9 wherein said system is a processor-based system.

11. The system of claim 9 wherein said storage stores instructions to cause said system to automatically send a message to determine whether the node is still accessible after said response to said discovery message is received.

* * * * *

UNITED STATES PATENT AND TRADEMARK OFFICE
CERTIFICATE OF CORRECTION

PATENT NO. : 6,914,887 B2
DATED : July 5, 2005
INVENTOR(S) : Idsinga

It is certified that error appears in the above-identified patent and that said Letters Patent is hereby corrected as shown below:

Column 4,
Line 27, delete "aver" and insert -- over --.

Signed and Sealed this

Sixth Day of September, 2005

JON W. DUDAS
*Director of the United States Patent and Trademark Office*